Jan. 7, 1936.  H. RAFLOVICH  2,026,996
METHOD OF MOLDING PIPES
Original Filed May 20, 1932
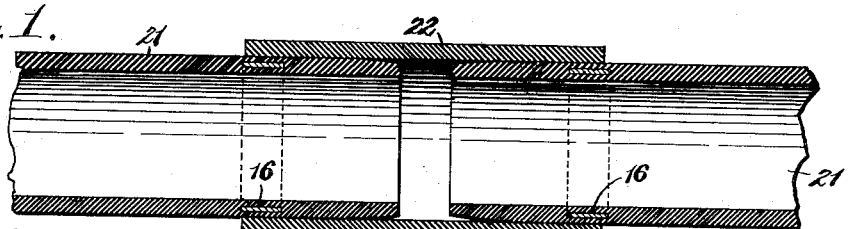
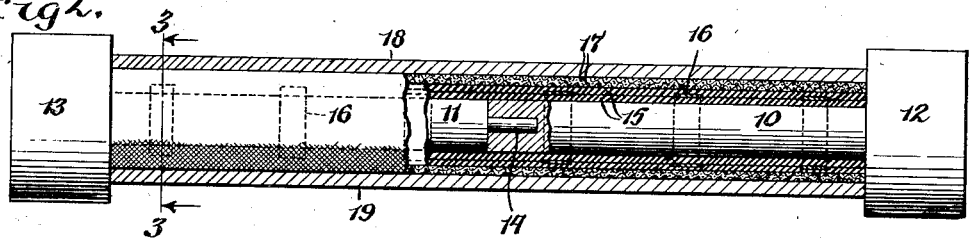
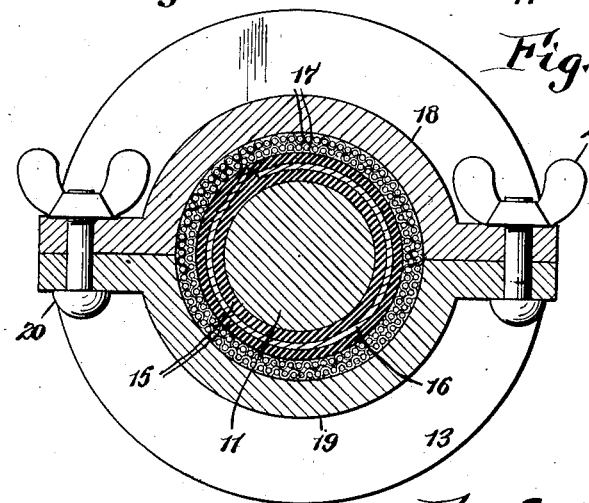
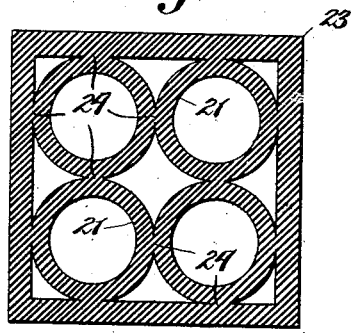
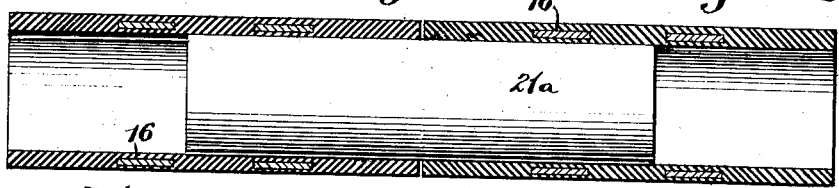
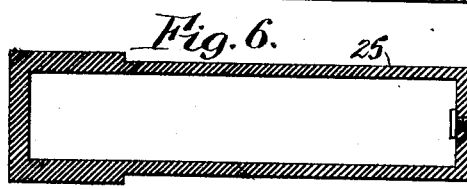
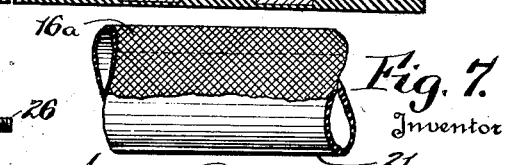
Inventor
Harry Raflovich
By Popp and Powers
Attorneys Patented Jan. 7, 1936

2,026,996

UNITED STATES PATENT OFFICE 2,026,996

METHOD OF MOLDING PIPES

Harry Raflovich, Detroit, Mich.

Application May 20, 1932, Serial No. 612,539
Renewed June 4, 1935

5 Claims. (Cl. 18—59)

This invention relates to a hollow article and method of molding the same and more particularly to a vulcanized rubber and fiber pipe of this character having a wide range of uses but being more particularly adapted for underground lines and also to form handles for vacuum cleaners and like appliances.

One of the principal objects of this invention is to provide a vulcanized rubber composition pipe which is strong and durable and will resist the corrosive action of water, air, acids and other destructive agents when used outside and is also strong and durable so that the pipe or tubing can be formed into handles for vacuum cleaners and like uses.

Another object is to provide such a rubber composition pipe which during the process of manufacture has metal reinforcing bands embedded therein so as to strengthen and reinforce the pipes.

A further object is to provide a simple and easy method of embedding these reinforcing bands in the body of the composition pipe.

Another purpose is to provide a method of making such composition pipe which permits, with the use of a single mold and mandrel, the production of pipe having its wall of any desired thickness thereby avoiding the necessity of providing separate molds for each weight of pipe.

A further aim is, in the production of pipe of this character, to provide means for preventing the pipe from sticking to the walls of the mold during the vulcanizing operation, which means also form part of the process for providing any desired thickness of pipe wall, as previously referred to.

Other objects are to provide a composition pipe of this character and a method of forming the same which permits such pipe to be quickly produced by production methods and at low cost and provides pipe which is of uniformly good quality.

In the accompanying drawing:

Fig. 1 is a longitudinal section through two ends of composition pipe made according to my invention and joined by a coupling section also made in accordance with my invention.

Fig. 2 is a longitudinal section through the mandrel and mold for making composition pipe in accordance with the present invention showing the pipe ready for vulcanizing.

Fig. 3 is a transverse section taken on line 3—3, Fig. 2.

Fig. 4 is a cross section through a multiple passage conduit which can be made in accordance with the present invention.

Fig. 5 is a view similar to Fig. 1 showing another manner in which pipe embodying the present invention can be employed.

Fig. 6 is a longitudinal section through an inflatable core or mandrel which can be used instead of the mandrel shown in Figs. 2 and 3.

Fig. 7 is a side elevation, partly broken away, of a length of pipe showing a modified form of my invention.

Fig. 8 is a transverse section therethrough.

Fig. 9 is a fragmentary view, on an enlarged scale, similar to Fig. 8.

In making composition rubber pipe in accordance with the present invention a mandrel shown in Figs. 2 and 3 is employed. This mandrel comprises two cylindrical sections 10 and 11 which fit together at their adjacent ends and terminate in enlarged cylindrical heads 12 and 13. In order to insure that the inner ends of the mandrel sections 10 and 11 fit together in proper relation one of the mandrel sections is provided with a dowel 14 which fits into an axial hole provided in the other mandrel section. On this mandrel the rubber composition, of which the body of the pipe is made, is wound, this composition being first formed into sheets.

The most suitable composition of the pipe has been found to be as follows. It will be understood, however, that satisfactory pipe can be made by using fibrous materials other than those set forth as the first four ingredients of the composition:

|  | Pounds |
|---|---|
| Waste Wool | 25 |
| Vegetable fiber, such as celotex | 15 |
| Asbestos | 5 |
| Rags | 10 |
| Rubber scrap | 10 |
| Sulfur | 5 |
| Petroleum jelly | 2 |
| Pitch or tar | 2 |

All of the above ingredients are mixed in a suitable mixing and shredding apparatus and the mixed material is then rolled into sheets. The waste wool, vegetable fiber, asbestos and rags form the fibrous content of the finished pipe and consequently can be substituted with a number of other fibrous materials although it has been found that the materials enumerated provide a very strong and durable pipe. The petroleum jelly serves as a softener and any softening oil can be used in its place. The pitch or tar colors the pipe, giving it a black color, serves as a binder when the material is in sheet form and also gives the finished pipe the requisite hardness.

After the rubber composition sheets 15 have been formed they are wound on the mandrel sections 10 and 11, the number of windings depending on the thickness specified for the wall of the finished pipe. After the first wrapping or wrappings of the rubber composition sheet has been wound on the mandrel one or more strips of metal 16 are wrapped into the composition sheet as it is being wound, these reinforcing strips 16 being sufficiently long to completely encircle the mandrel. These strips are preferably of sufficient width to form a strong reinforcement for the pipe section but are not so wide as not to be readily wound into the composition sheet while it is being wrapped on the mandrel. After the reinforcing strips 16 have been wound in with the wrapping of the composition sheet the winding of the composition sheet is continued until the specified thickness of composition material has been wound on the mandrel sections 10 and 11. The composition sheet 15 is then cut off and a rag 17 is then wound over the rubber composition sheet. This rag 17 is designed to fill the remaining space between the rubber composition body on the mandrel and the inside of the two sections 18 and 19 of the mold and hence the number of windings of the rag 17 over the rubber composition will depend upon the thickness of pipe specified. After the rag 17 has been wound on, the sections 18 and 19 of the pipe mold are clamped over the mandrel, composition sheet 15 and rag 17 and these two sections of the mold are held in place by fastenings 20.

This assembly is then placed in a vulcanizing kettle where it is heated to a temperature sufficient to vulcanize the rubber scrap and sulfur and to unite the several windings of the composition sheet 15 into one homogeneous body. After the vulcanization has taken place the assembly is removed from the vulcanizing kettle, the two halves 18 and 19 of the mold are separated and the rag 17 unwound from the pipe. The two ends 12 and 13 of the mandrel are then placed in two chucks and rotated in opposite directions and withdrawn. This method of withdrawing the two mandrel sections prevents any distortion of the pipe and provides a simple and easy method of removing the mandrel.

The completed pipe 21 is therefore of the form shown in Fig. 1, its walls being formed of a homogeneous rubber and fiber composition and provided at any desired interval with the reinforcing strips 16 which are compeltely embedded in the composition and encircle the pipe. If desired, the ends of the pipe 21 can be tapered as shown in Fig. 1 so as to fit tightly within the coupling sleeve 22 which can be made in the same manner as the pipe itself.

It is apparent that the pipe can be made in many forms. In Fig. 4 is shown a multiple passage conduit in which several pipe lengths are placed together to form a square and the whole surrounded by a square shell 23. The shell and the pipe sections are placed in the relation shown before the whole is placed in the vulcanizing kettle so that at the contacting places between the pipe sections 21 and the shell 23 and between the pipe sections 21 and one another an integral connection as indicated at 24 is provided.

In Fig. 5 is shown another form in which the pipe sections 21 are tapered internally at their ends and receive corresponding pipe sections 21a which are tapered externally. By this means a double wall pipe is provided which is adequately sealed against the entrance of moisture.

Instead of the two-part mandrel shown in Figs. 2 and 3 an inflatable and deflatable rubber cylinder 25 can be provided. This rubber cylinder 25 is provided with an air valve 26 which can be of any suitable form so that it will hold pressure within the rubber cylinder, the conventional tire valve being suitable for this purpose. This rubber cylinder 25 when inflated serves as a mandrel on which the sheet of composition, the reinforcing strip 16 and the rag 17 can be wound and the mold sections 18 and 19 placed therearound and the assembly is placed in the vulcanizing kettle as described. When the assembly is removed the rubber cylinder 25 can be deflated and can then be easily removed from the finished pipe section.

In Figs. 7, 8 and 9 is shown a modified form of my invention which is similar to that shown in Figs. 1–3 except that instead of providing the imperforate metal strips 16 wire mesh screening 16a is substituted therefor. This wire mesh screening can be of any suitable gage and form and is embedded in the pipe in the same manner as the imperforate strips 16 in the preferred construction, that is, sheets of rubber composition are wound upon the mandrel, the screen 16a is wound over these rubber composition windings or lappings and additional sheets of rubber composition are then wound or lapped around the screening, the whole being then placed in a vulcanizing kettle in the same manner as described with reference to the form of the invention shown in Figs. 1–3. It has been found that this form of the invention provides an extremely rigid and strong construction which is particularly suitable for vacuum cleaner handles or the like.

From the foregoing description it is apparent that the present invention provides a pipe which is of a composition that will resist the effect of the elements and at the same time is strong and durable. This composition pipe is also adequately reinforced by the strips 16 which are easily and quickly embedded in the pipe by simply winding them in when the sheet composition is wound upon the mandrel to provide a pipe having walls of the desired thickness.

The method of winding the pipe also permits of the production of the pipe by production methods and the use of the rag 17 around the pipe not only permits the pipe having different thickness of walls to be produced in the same mold but also completely prevents sticking of the composition pipe to the walls of the mold.

I claim as my invention:

1. The method of molding hollow articles composed of fiber and a binder which hardens under heat which comprises applying said fiber and binder to a core helically wrapping a porous sheet around said fiber and binder the number of times to provide the proper thickness for a predetermined mold, applying said mold to said porous sheet, subjecting said assembled core, fiber and binder sheet and mold to temperatures sufficiently high to harden said binder and subsequently removing said core, mold and sheet from the molded article.

2. The method of molding hollow articles composed of fiber and a binder which hardens under heat, which comprises forming said fiber and binder into a sheet, wrapping said sheet around a core the number of times to provide the desired thickness of the walls of said article, helically wrapping a piece of porous material around said wrapped sheet the number of times to provide the proper thickness for a predetermined mold, applying said mold to said piece of porous material, subjecting said assembly to temperatures sufficiently high to harden and unite the wrappings of said sheet and subsequently removing said core, piece of porous material and mold from the molded article.

3. The method of molding hollow articles composed of fiber and rubber, which comprises forming rubber and fiber into a sheet, wrapping said sheet around a core the number of times to provide the desired thickness of the walls of said article, helically wrapping a rag around said wrapped sheet the number of times to provide the proper thickness for a predetermined mold, applying said mold to the exterior of said wrapped rag, placing said assembly in a vulcanizing kettle and subsequently removing said core, rag and mold from the molded article.

4. The method of molding a pipe composed of fiber and rubber, which comprises forming unvulcanized rubber and fiber into a sheet, wrapping said sheet on a two part mandrel having enlarged end heads, wrapping a rag around said wrapped sheet the number of times to provide the desired thickness for a predetermined two part mold, applying said mold to the exterior of said wrapped rag and between said end heads, placing said assembly in a vulcanizing kettle and subsequently removing said mold and rag and also removing said mandrel by twisting the two parts thereof in opposite directions and withdrawing them.

5. The method of molding a reinforced pipe composed of fiber and rubber, which comprises forming unvulcanized rubber and fiber into a sheet, helically wrapping said sheet on a mandrel the number of times to provide the desired thickness of the walls of said article, wrapping at least one strip of metal in with and between the wrappings of said sheet, helically wrapping a rag around said wrapped sheet the number of times to provide the desired thickness for a predetermined mold, applying said mold to the exterior of said wrapped rag, and placing said assembly in a vulcanizing kettle to harden and unite the wrappings of said sheet.

HARRY RAFLOVICH.